United States Patent [19]

Summe

[11] Patent Number: 5,289,109
[45] Date of Patent: Feb. 22, 1994

[54] CURRENT LIMIT CIRCUIT

[75] Inventor: Richard A. Summe, Kokomo, Ind.

[73] Assignee: Delco Electronics Corporation, Kokomo, Ind.

[21] Appl. No.: 488,160

[22] Filed: Mar. 5, 1990

[51] Int. Cl.⁵ ............................................. G05F 1/573
[52] U.S. Cl. ..................................... 323/277; 361/18
[58] Field of Search ............... 323/265, 273, 274, 275, 323/277, 278; 361/18; G05F 1/573

[56] References Cited

U.S. PATENT DOCUMENTS

| | | | |
|---|---|---|---|
| 3,109,981 | 11/1963 | Muchnick | 323/276 |
| 3,305,725 | 2/1967 | Huge et al. | 307/46 |
| 3,391,330 | 7/1968 | Grossoehme | 323/277 |
| 3,527,997 | 9/1970 | Nercessian | 323/277 |
| 3,896,367 | 7/1975 | Frantz | 323/351 |
| 4,176,309 | 11/1979 | Schulz et al. | 323/280 |
| 4,800,331 | 1/1989 | Vesce et al. | 323/277 |
| 4,887,021 | 12/1989 | Walker | 323/279 |

Primary Examiner—Steven L. Stephan
Assistant Examiner—Ben M. Davidson
Attorney, Agent, or Firm—Jimmy L. Funke

[57] ABSTRACT

A current limit circuit for limiting current flow through a load circuit. The amount of current flowing in the circuit is sensed by a current sensing resistor. The circuit includes a P-channel field effect transistor and an NPN bipolar transistor. When current sensed by the resistor attains a current limit value, the field effect transistor is turned on and its output current is amplified by the NPN transistor. The emitter of the NPN transistor is connected to the gate of another P-channel field effect transistor which is connected to the load circuit.

2 Claims, 1 Drawing Sheet

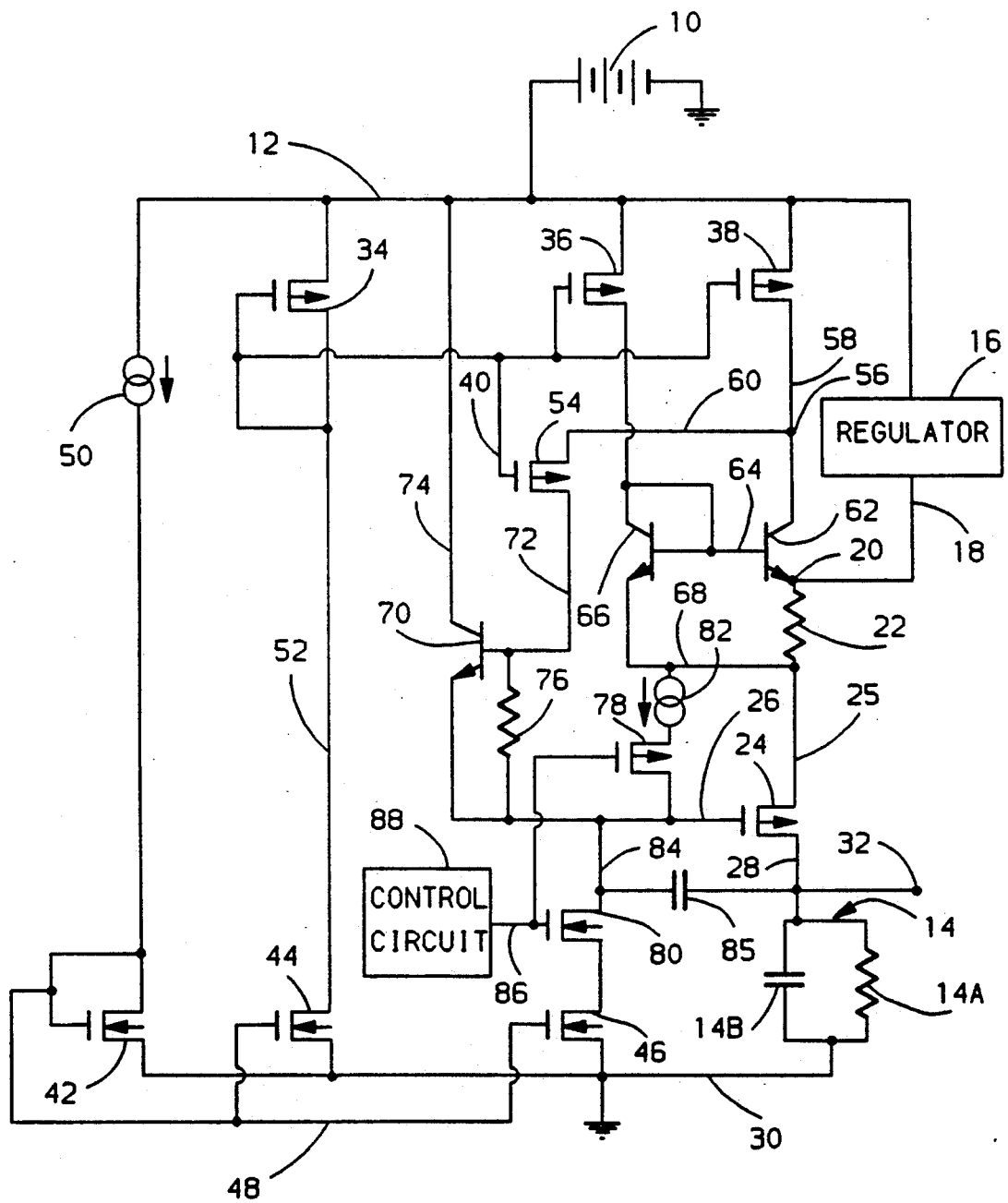

CURRENT LIMIT CIRCUIT

This invention relates to current limit circuits for limiting the amount of current that is allowed to flow through an electrical circuit.

Current limit circuits that utilize bipolar transistors are well known to those skilled in the art, one example being the current limit circuit shown in the DeShazo, Jr. et al. U.S. Pat. No. 4,672,302.

This invention is concerned with providing a current limit circuit that can be fabricated by a CMOS process and which utilizes field effect transistors and a bipolar NPN transistor. More specifically, this invention utilizes a P-channel field effect transistor and a NPN bipolar transistor. The drain of the field effect transistor is connected to the base of the NPN transistor and the system includes current sensing means for sensing load current which is operative to cause the field effect transistor to be biased conductive when load current sensed by the current sensing means attains a current limit value. When the field effect transistor turns on, its output current is amplified by the NPN transistor. The output of the NPN transistor is connected to the gate of a load current controlling P-channel field effect transistor which is connected to control the magnitude of the load current. When load current reaches a predetermined current limit value, the conduction of the load current controlling P-channel transistor is controlled to thereby limit the load current to a predetermined value.

IN THE DRAWINGS

The single FIGURE drawing is a schematic circuit diagram of a current limit circuit made in accordance with this invention.

Referring now to the drawing, the reference numeral 10 designates a source of direct voltage which has been illustrated as a battery. The battery can be the storage battery on a motor vehicle and is a 12 volt battery. The positive side of battery 10 is connected to a power supply line 12. The opposite side of battery 10 is grounded. The battery 10 is charged by a diode-rectified alternating current generator (not illustrated). The voltage on conductor 12 may go as high as about 16 volts when the battery is being charged and as low as about 9 volts when the battery is supplying electrical loads on the vehicle such as the electric starting motor.

The electrical load of the system is designated as 14 and it is comprised of a resistance 14A and capacitance 14B.

Current is supplied to load 14 from a voltage regulator 16. The voltage regulator 16 receives input voltage from line 12 and develops an output voltage that is applied to conductor 18. The regulator operates to maintain a substantially constant voltage of about 7 volts on line 18. Thus, even if the voltage on line 12 should drop to about 9 volts, or go as high as 16 volts, the voltage on line 18 will be maintained at 7 volts.

The line 18 is connected to a junction 20. A current sensing resistor 22, which may be about 0.5 ohms, is connected between junction 20 and the source of a P-channel enhancement mode field effect transistor 24 through line 25. The gate of transistor 24 is connected to line 26 and its drain is connect to one side of load 14 via conductor 28. The opposite side of load 14 is connected to grounded conductor 30.

As will be more fully described, hereinafter transistor 24 is biased into a current limit mode when the current through resistor 22 attains a certain current limit magnitude. Further, transistor 24 can be biased either on or off to provide an output voltage at junction 32 that goes high or low. When transistor 24 is biased conductive, the voltage at junction 32 goes high and when transistor 24 is biased nonconductive, the voltage at junction 32 goes low.

The current limit circuit has P-channel enhancement mode field effect transistors 34, 36 and 38 that operate as current sources. The gates of these transistors are connected together and to a conductor 40. Further, the circuit has N-channel enhancement mode field effect transistors 42, 44 and 46 that operate as current sources. The gates of these transistors are connected together by conductor 48. A current source 50 is connected between line 12 and the drain of transistor 42. Further, the drain of transistor 34 is connected to the drain of transistor 44 by conductor 52.

The conductor 40 is connected to the gate of a P-channel enhancement mode field effect transistor 54. The source of transistor 54 is connected to a junction 56 on a conductor 58 by conductor 60. The conductor 58 connects the source of transistor 38 to the collector of a bipolar NPN transistor 62. The emitter of transistor 62 is connected to junction 20 and hence to one side of current sensing resistor 22.

The base of transistor 62 is connected to a conductor 64. An NPN bipolar transistor 66, which is connected as a diode, has its base connected to conductor 64 and its emitter connected to conductor 68. The base-emitter junction of transistor 66 forms a diode which conducts current from line 64 to line 68. The line 68 is connected to line 25.

The drain of transistor 54 is connected to the base of an NPN bipolar transistor 70 by a conductor 72. The collector of transistor 70 is connected to line 12 by a conductor 74. A resistor 76, which may be about 200K ohms, is connected across the base and emitter of transistor 70. The emitter of transistor 70 is connected to conductor 26.

To provide on-off control of transistor 24, a P-channel enhancement mode field effect transistor 78 and an N-channel enhancement mode field effect transistor 80 are provided. The source of transistor 78 is connected to line 68 through current source 82. The drain of transistor 78 is connected to conductor 26. The drain of transistor 80 is connected to line 26 by conductor 84. The source of transistor 80 is connected to the drain of transistor 46. A capacitor 85 is connected between lines 84 and 28.

The gates of transistors 78 and 80 are connected to a conductor 86 which, in turn, is connected to an on-off control circuit 88 that drives conductor 86 selectively either high or low. When the voltage on conductor 86 is high, transistor 78 is biased nonconductive and transistor 80 is biased conductive. The voltage on conductor 26 now goes low to bias transistor 24 conductive.

When the voltage on conductor 86 goes low, transistor 78 is biased conductive and transistor 80 nonconductive. The voltage on line 26 now goes high causing transistor 24 to be biased nonconductive.

The operation of the current limit circuit will now be described. Let it be assumed that transistor 24 is biased conductive. The voltage between line 18 and ground produced by regulator 16 causes current to flow through resistor 22, through conductor 25, through transistor 24 and then through load 14. The voltage drop across current sensing resistor 22 is proportional to load current and the voltage at junction 20 increases with increasing load current. When the current through resistor reaches a predetermined current limit value, the voltage at junction 20 increases to such a voltage as to raise the voltage of the emitter of transistor 62 to such a value that causes the current through transistor 62 to decrease. Putting it another way, transistor 62 is now biased to reduce the current flowing between its collector and emitter. In regard to the biasing of transistor 62, it will be appreciated that base voltage of transistor 62 is held at a constant reference value by transistor 66 and, accordingly, a predetermined increase in the emitter voltage of transistor 62 will cause a decrease in the current between its collector and emitter.

As the current decreases through transistor 62, the current supplied to the source of transistor 54 via conductors 58 and 60 increases. Putting it another way, the voltage at the source of transistor 54 increases to a level which causes transistor 54 to be turned on. In this regard, the gate of transistor 54 has a constant voltage and when the voltage of the source of the transistor 54 exceeds the gate voltage, by more than a threshold voltage, transistor 54 is turned or biased on. With transistor 54 biased on, the output current of this transistor is applied to the base of transistor 70 through line 72. Transistor 70 amplifies the output current of transistor 54 and the emitter current of transistor 70 is applied to the gate of transistor 24 via line 26. This emitter or output current of transistor 70 when applied to the gate of transistor 24 tends to bias transistor 24 such that its conduction, or the amount of current that it passes is reduced. Putting it another way, increased conduction of transistor 70 tends to increase the voltage applied to the gate of transistor 24 which, in turn, biases transistor 24 in a direction to maintain the amount of current it passes or conducts to the current limit value. Accordingly, the current supplied to load 14 is not allowed to exceed a predetermined current limit value.

It can be appreciated that current limit operation begins when transistor 54 is biased conductive. At values of load current below the current limit value, transistor 54 is biased nonconductive.

The current limit current that has been described is fabricated by a CMOS process. This process can produce a bipolar NPN transistor but not a bipolar PNP transistor.

The current limit circuit limits the current that can flow through load 14. However, the primary purpose of the current limit circuit is to protect the semiconductor components of the circuit which can generate excessive heat if current flow through the components is not limited to a safe value. In this regard, the circuit is fabricated on a single chip and the chip temperature should not exceed a certain value. The voltage regulator 16 is part of the chip and the current supplied by it must be limited. Further, the current through field effect transistor 24 must be limited to prevent excessive heat generation.

One of the primary advantages of the current limit circuit of this invention is that it can operate satisfactorily at low voltage. Thus, the circuit of this invention will operate properly with a voltage as low as one volt between conductors 12 and 25.

The embodiments of the invention in which an exclusive property or privilege is claimed are defined as follows:

1. A current limit circuit for providing a control signal of a predetermined magnitude when the current passing through a circuit attains a predetermined current limit value comprising, a resistor in said circuit for sensing the magnitude of current flowing in said circuit, a P-channel field effect transistor, and NPN bipolar transistor, means connecting the drain of said field effect transistor to the base of said NPN transistor, said field effect transistor when biased conductive applying current to the base of said NPN transistor that is high enough to cause the emitter current of said NPN transistor to attain said predetermined magnitude, means for developing and applying a substantially constant voltage to the gate of said P-channel field effect transistor, and means coupled to said resistor and to the source of said field effect transistor for developing and applying a control voltage to said source of said field effect transistor that increases to a level which will cause it to conduct when the current passing through said circuit attains said predetermined current limit value.

2. A current limit circuit for limiting the amount of load current that can flow through an electrical load in a load circuit comprising, a source of direct voltage, a load circuit connected across said source of direct voltage, said load circuit comprising in a series connection a current sensing resistor, the source and drain of a first P-channel field effect transistor and said electrical load, a second P-channel field effect transistor, an NPN bipolar transistor, means connecting the drain of said second field effect transistor to the base of said NPN transistor, means connecting the collector of said NPN transistor to one side of said source of direct voltage, means connecting the emitter of said NPN transistor to the gate of said first field effect transistor, means for developing and applying a substantially constant voltage to the gate of said second P-channel field effect transistor, and means coupled to said resistor and to the source of said second field effect transistor for developing and applying a voltage to said source of said second field effect transistor that increases to a value that is high enough to bias said second field effect transistor conductive when the level of said load current in said load circuit attains a current limit value, said second field effect transistor when biased conductive applying current to the base of said NPN transistor that causes the emitter current of said NPN transistor to attain a level that causes said first field effect transistor to limit the said load current in said load circuit to said predetermined current limit value.

* * * * *